(12) United States Patent
Nakano

(10) Patent No.: US 8,136,912 B2
(45) Date of Patent: Mar. 20, 2012

(54) INSPECTIVE EJECTION METHOD FOR FLUID EJECTION APPARATUS AND FLUID EJECTION APPARATUS IMPLEMENTING THE METHOD

(75) Inventor: Kenichi Nakano, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 770 days.

(21) Appl. No.: 12/330,655

(22) Filed: Dec. 9, 2008

(65) Prior Publication Data
US 2009/0147035 A1    Jun. 11, 2009

(30) Foreign Application Priority Data
Dec. 11, 2007    (JP) .................................. 2007-319278

(51) Int. Cl.
*B41J 29/393* (2006.01)
*B41J 29/38* (2006.01)
(52) U.S. Cl. ........................................... 347/19; 347/12
(58) Field of Classification Search ..................... 347/12, 347/19
See application file for complete search history.

(56) References Cited

U.S. PATENT DOCUMENTS
6,736,480 B2 *    5/2004    Endo ............................... 347/19

FOREIGN PATENT DOCUMENTS
WO    2000/029219    5/2000

* cited by examiner

*Primary Examiner* — Julian Huffman
(74) *Attorney, Agent, or Firm* — Maschoff Gilmore & Israelsen

(57) ABSTRACT

An inspective ejection method using inspective injection data, including unit ejection data and non-ejection data, for causing fluid to be ejected from nozzle orifices of a fluid ejection apparatus. The unit ejection data is used for individually inspecting each of a group of continuous nozzle orifices of a predetermined number M, less than total number Q. The non-ejection data having a length of at least Q–M is continuously added to a leading or trailing side in a unit ejection data reading direction. A transfer start address is selected in the area of the inspective ejection data at an interval of M, while avoiding duplication of the transfer start address. The inspective ejection data is transferred to an ejection driving unit, starting from the selected transfer start address. The selecting transferring steps are repeated a whole number of times that is Q/M or greater, while changing the transfer start address.

4 Claims, 13 Drawing Sheets

INSPECTIVE EJECTION METHOD FOR FLUID EJECTION APPARATUS AND FLUID EJECTION APPARATUS IMPLEMENTING THE METHOD

BACKGROUND

1. Technical Field

The present invention is broadly included in the technical field of ejecting a fluid from nozzle orifices. More particularly, the present invention relates to an inspective ejection method to be carried out on a fluid ejection apparatus to find any clogged nozzle orifice or nozzle orifices, and also to a fluid ejection apparatus implementing the inspective ejection method.

2. Related Art

Known ink jet printers as the fluid ejection apparatus eject ink droplets from nozzle orifices provided in a recording head module (ejection unit) so as to print on a target such as paper. When ink in the nozzle orifice thickens, the viscous ink residue clogs the nozzle orifice and disadvantageously leads to a blank ink dot due to failure of ejection.

WO00/29219 discloses a detection device for detecting such kind of blank ink dot (clogged nozzle orifice). This detection device determines that ink droplets are safely ejected when a leaser beam emitted from a light source is shielded by the ink droplets ejected from nozzle orifices. On the other hand, the device detects an ejection error (clogged nozzle orifice) caused by the viscous ink residue when the leaser beam is not shielded. When the ejection error is detected, the nozzle orifices of recording head modules are put under cleaning.

When a plurality of nozzle orifices are inspected, the inspection needs to be executed for each of the nozzle orifices one by one. The detection device disclosed in WO00/29219 is configured such that the inspection is executed while a relative position between the recording head module and the detection device continuously shifts so that the laser beam intersects with ink-droplets-ejection paths (ink-droplets-flight paths).

For instance, the recording head module has the plurality of (for example, 180) nozzle orifices arranged at a constant pitch, the nozzle orifices being arranged in arrays corresponding to associated ink colors. The nozzle orifices are marked with numbers, for example, #1 to #180. Firstly, positioning is conducted so that the ink-droplets-flight path of the nozzle orifice #1 intersects with an emission path of the laser beam, and then, ejection of the ink droplet is conducted so that clogging (blank dot) of the nozzle orifice #1, if any, is detected. By doing the same for all nozzle orifices #1 to #180 with shifting the number of nozzle orifices in turn, all the nozzle orifices #1 to #180 are inspected.

However, generating ejection data in the form of a dot pattern for the inspection, based on the ejection order of all the nozzle orifices #1 to #180, disadvantageously requires enormous storage capacity to store the generated ejection data in a memory (image buffer).

SUMMARY

An advantage of some aspects of the invention is that an inspective ejection method, as well as a fluid ejection apparatus, can be realized by using a smaller storage area for storing inspective ejection data in accordance with which a fluid is ejected from the nozzle orifices for the purpose of nozzle orifice inspection.

An aspect of the invention is an inspective ejection method for causing a fluid to be ejected from nozzle orifices of a fluid ejection apparatus, the fluid ejection apparatus including an ejection unit having a plurality of the nozzle orifices capable of allowing the fluid to be ejected therethrough to a target, and an ejection driving unit which drives the ejection unit, the method including steps of: storing inspective ejection data in a memory, the inspective ejection data including: unit ejection data which is a data corresponding to a group of continuous nozzle orifices of a predetermined number M which is less than total number Q of the nozzle orifices and has ejection-executing data configured to shift a timing of ejection from each of the nozzle orifices to be inspected and be capable of executing at least one ejection per one nozzle orifice for a predetermined number M of nozzle orifices with shifting a timing of ejection between nozzle orifices from which ejections are impossible to be detected at the same time; and non-ejection data having a length of at least Q−M and being added continuously to at least one of a leading side and a trailing side in a unit ejection data reading direction; selecting one transfer start address from among a plurality of transfer start addresses which are set in the area of the inspective ejection data at an interval of M, the selection being made in a manner to avoid duplication of the transfer start address; transferring to the ejection driving unit the inspective ejection data read from the memory starting from the selected transfer start address, the inspective ejection data having a predetermined data length which is longer than the length for the total number of nozzle orifices; and repeating the selecting step and the transferring step a plurality of times of a natural number which is Q/M or greater while changing the transfer start address. The number of ejections may differ among the nozzle orifices as long as ejection is executed at least once in the nozzle orifice to be inspected. Also, among all nozzle orifices, ejection may not be executed in nozzle orifices not to be inspected. Additionally, the total number Q of the nozzle orifices indicates a total number of nozzle orifices selected based on a kind of fluid (e.g. according to each array of the nozzle orifices).

According to this arrangement, one transfer start address is selected from among the plurality of transfer start addresses which are set in the area of the inspective ejection data at an interval of data corresponding to a predetermined number of nozzle orifices. The data read from the transfer start address, which has the predetermined data length, is transferred from the memory to the ejection driving unit. Consequently, the ejection driving unit drives the ejection unit to eject fluids from the nozzle orifices in accordance with the transferred ejection data. Then, setting the transfer start address and transferring the data read from the memory starting from the set transfer start address are repeated a plurality of times while changing the transfer starting address, whereby the inspective ejection of fluid is executed at least once per one nozzle orifice of all nozzle orifices to be inspected of the ejection unit. Therefore, storing area in the memory for the inspective ejection data is kept to be small since the size of the inspective ejection data is small.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
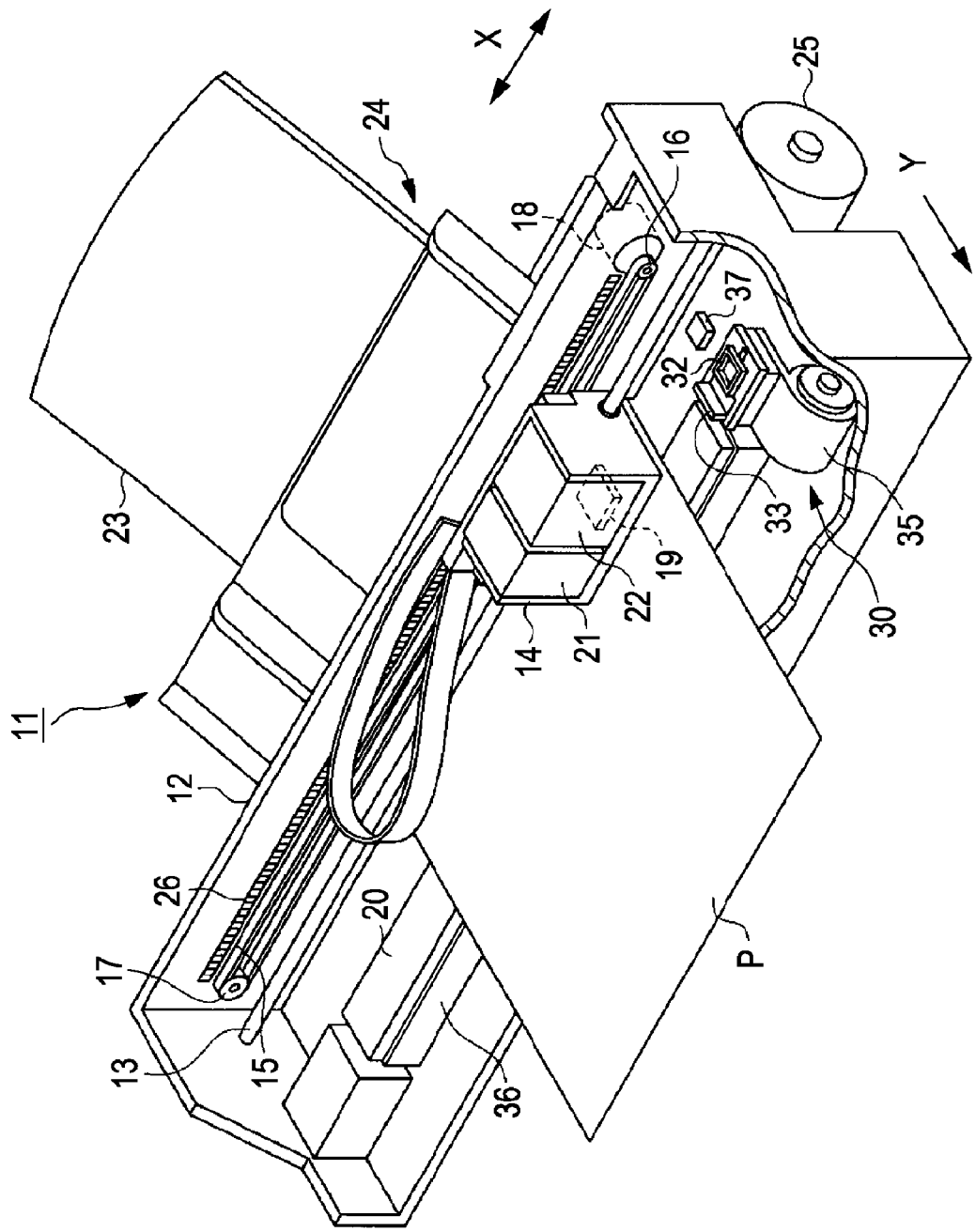
FIG. 1 is a schematic perspective view of a printer as one embodiment.

An exemplary embodiment of the present invention will be disclosed hereinafter with reference to FIGS. 1 to 12. An inkjet recording apparatus (hereinafter referred to as "printer 11") which functions as a fluid ejection apparatus is a serial printer having an upwardly opening, substantially rectangular box-shaped casing 12, as shown in FIG. 1. A guiding shaft 13 laid over the inner space of the casing 12 carries a carriage 14, allowing the carriage 14 to reciprocate in the main scanning direction (the direction indicated by a double-headed arrow X in FIG. 1). An endless timing belt 15 is positioned behind the carriage 14, being wound around a pair of belt pulleys 16 and 17 which are rotatably supported on an inner surface adjacent to the rear side of the casing 12. The carriage 14 is configured so as to reciprocate in the main scanning direction X by a for-and-backward drive of a carriage motor 18, the carriage motor 18 having a driving shaft connected to one belt pulley 16.

A recording head module 19 is provided under the carriage 14, and functions as an ejection unit that ejects (shoots) ink droplets. The casing 12 receives a platen 20 placed under the recording head module 19 and facing the recording head module 19, the platen 20 fixing a distance between the recording head module 19 and a recording sheet P as a target. Also, the carriage 14 detachably carries ink cartridges 21 and 22 for black and color ink. The recording head module 19 ejects ink droplets of different colors from the associated arrays of nozzle orifices, each of the arrays corresponding to one of the colors of the ink supplied from the associated ink cartridges 21 and 22.

The printer 11 has a sheet-feeding tray 23 and an auto sheet feeder 24 provided at the rear side thereof. The auto sheet feeder 24 separates only one sheet at the top of a stack from a stack of a plurality of recording sheets P on the sheet-feeding tray 23 and feeds the separated sheet in a sub-scan direction Y.

A sheet feeding motor 25 is located under the casing 12 and at a lower right side in the illustration shown in FIG. 1. The sheet feeding motor 25 drives a pair of transporting rollers and a pair of sheet ejecting rollers (both are not shown in figures), whereby the recording sheet P is transported in the sub-scan direction Y. A printing operation is executed while the carriage 14 is moving in the main scanning direction X, ink droplets being ejected from the nozzle orifices of the recording head module 19 to the recording sheet P in the printing operation. And then, a sheet-transporting operation is executed, the recording sheet P being transported by a predetermined distance in the sheet-transporting operation. These operations are alternately repeated, so that the printing is conducted on the recording sheet P.

The printer 11 incorporates a linear encoder 26 which extends along the guiding shaft 13. The linear encoder 26 outputs pulses of a number proportional to a travel distance of the carriage 14, and, accordingly, a position in the main scanning direction, a moving speed, and a moving direction of the carriage 14 are determined.

In the printer 11 illustrated in FIG. 1, the right end of the moving path of the carriage 14 is set to be a home position. When the carriage 14 is located at the home position, a maintenance device 30 is positioned directly below the carriage 14. The maintenance device 30 conducts cleaning for preventing and/or removing the clogs and the like of the nozzle orifices of the recording head module 19. The maintenance device 30 includes a cap 32, a wiper 33 and a suction pump 35. The maintenance device 30 activates the suction pump 35 while keeping the cap 32 in contact with an opening surface in which the nozzle orifices of the recording head module 19 opens in order that the space defined by the opening surface and the cap 32 is vacuumed. Consequently, ink residues are forcibly drawn from the nozzle orifices of the recording head module 19, whereby the nozzle orifices are cleaned. The ink residues drawn out by the cleaning are discharged through the cap 32 into a tank 36 placed under the platen 20 via the suction pump 35.

The printer 11 of the embodiment has a nozzle inspection device 37 which is located adjacent to the maintenance device 30 and which detects the clogged nozzle orifice of the recording head module 19, if any. The nozzle inspection device 37 checks the presence of the clogged nozzle orifice by detecting a safe ejection of the ink droplet from each nozzle orifice. Various kinds of systems may be employed in the inspection as long as being capable of detecting the clogged nozzle orifice. For instance, a laser system is employed. The laser system employs a laser beam emitted from a light source so as to intersect an ink-droplets-flight path (predicted path), and determines that there is a clogged nozzle orifice when the light receiving unit receives a laser beam which otherwise is shielded by an ink droplet. The device such as the one disclosed in WO00/29219 can be employed as the laser system. Alternatively, the following electric field system can be employed as another system. The electric field system relies upon a method which includes following steps: applying a voltage between the recording head module 19 and the cap 32 so that the recording head module 19 and the cap 32 are negatively charged and positively charged, respectively; ejecting the negatively charged ink droplets from the recording head module 19, whereby the electric field between the recording head module 19 and the cap 32 changes while the negatively charged ink droplets are approaching to the positively charged cap 32 due to the electrostatic induction, and whereby the electric field changes due to the neutralization of the charge caused by the ink droplets leaching to the cap 32; evaluating the integral of measurement signals reflecting these changes in the electric field by an integrating circuit;

and determining that the nozzle orifice is clogged when the integral does not exceed a predetermined threshold.

Figure 2:
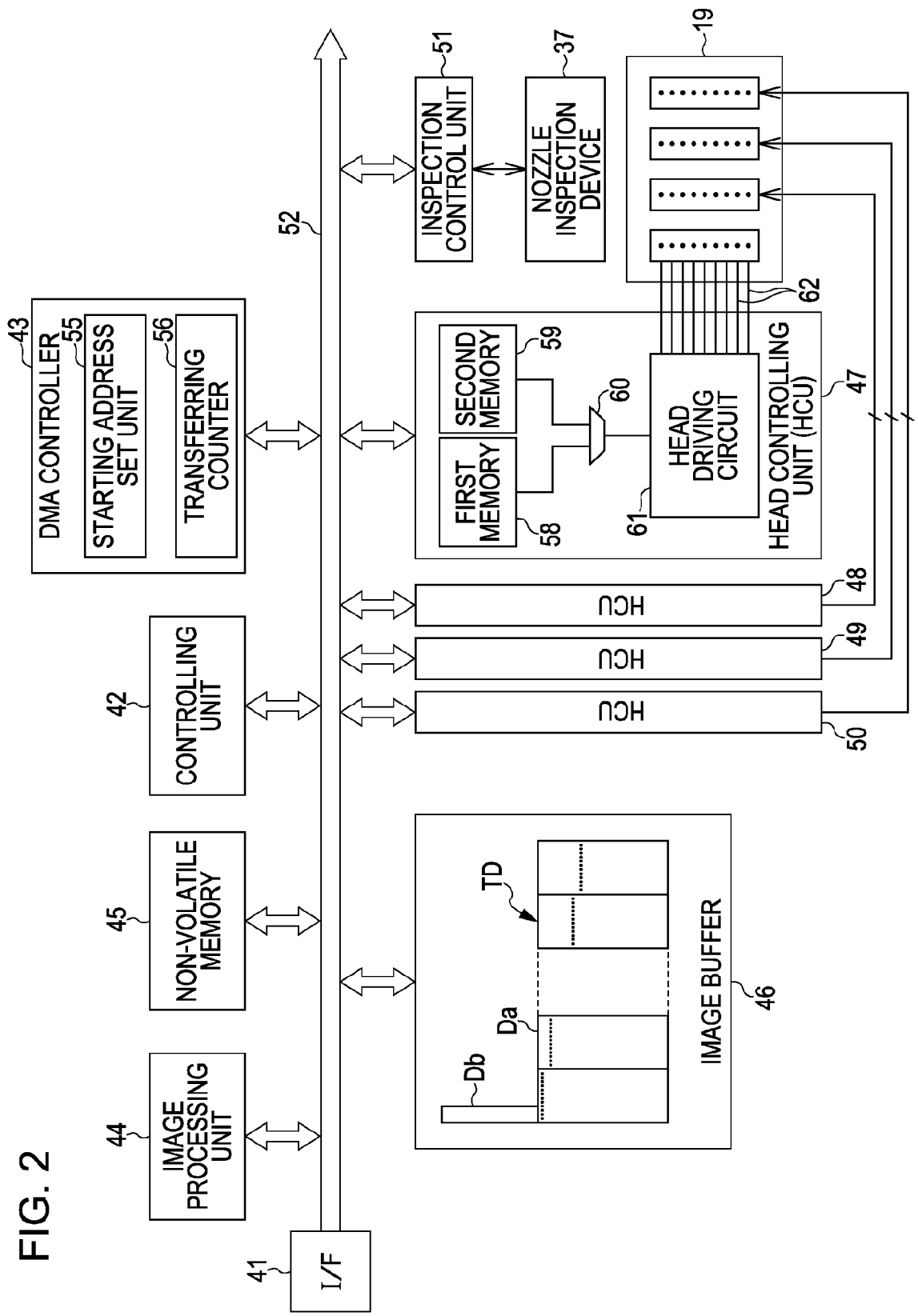
FIG. 2 is a block diagram illustrating an electrical structure of the printer.
Figure 3:
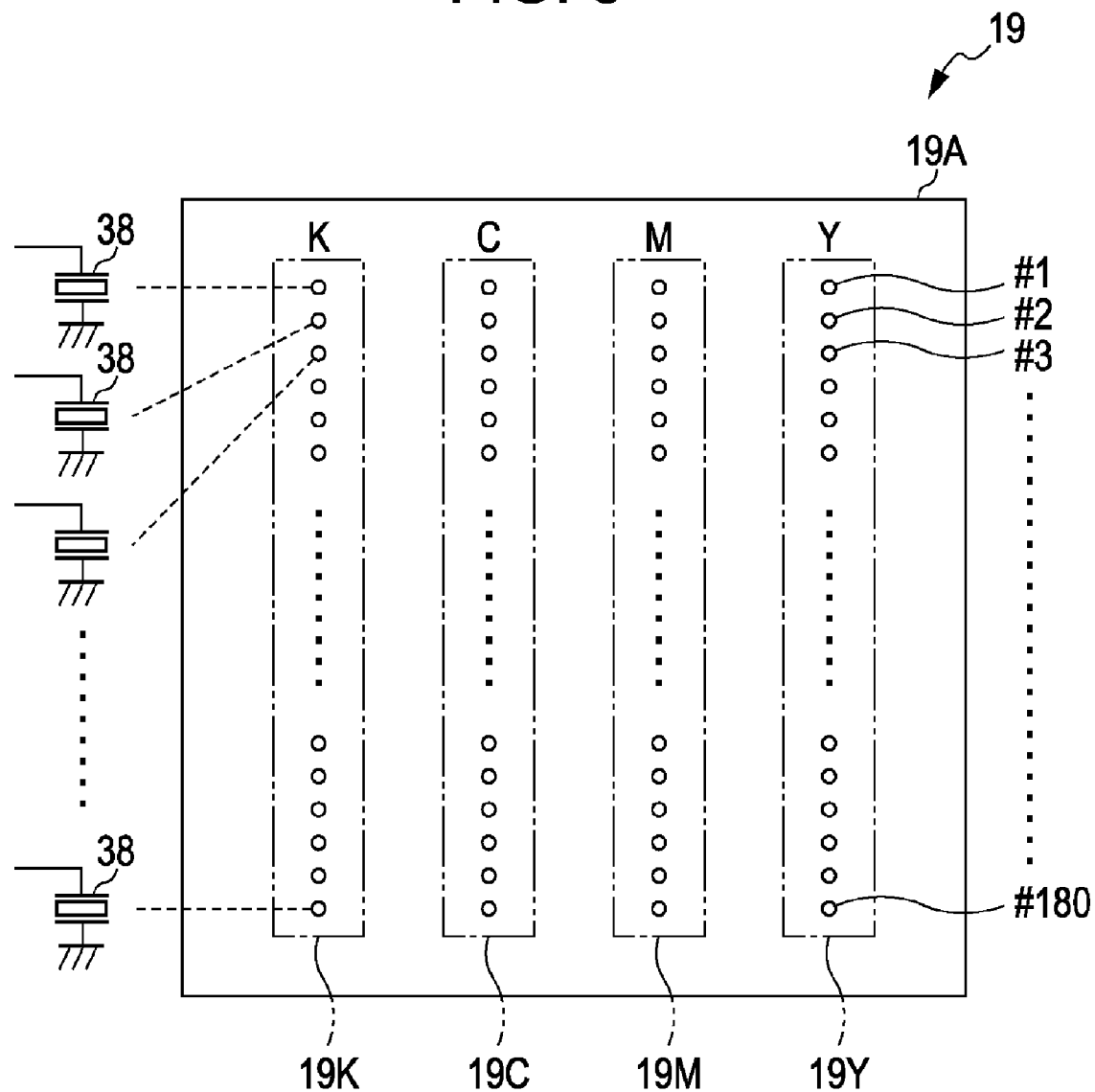
FIG. 3 is a schematic bottom plan view illustrating a recording head module together with an ejection element.

FIG. 3 illustrates the bottom surface of the recording head module. The bottom surface of the recording head module 19 is a nozzle orifice opening surface 19A in which a plurality of nozzle orifices opens. The nozzle orifice opening surface 19A has four-color arrays of nozzle orifices arranged therein, the colors being black (K), cyan (C), magenta (M) and yellow (Y), denoted by 19K, 19C, 19M and 19Y, respectively. Each of the arrays 19K, 19C, 19M and 19Y of the nozzle orifices is configured with the 180 of nozzle orifices #1 to #180 arranged at a constant nozzle pitch in the sub-scan direction Y (a vertical direction in FIG. 3). The recording head module 19 has ejection elements 38 provided therein (however, schematically illustrated at the outside of the recording head module in FIG. 3), the ejection elements 38 being the same in number as the nozzle orifices, each of which corresponds to one of the nozzle orifices #1 to #180. The ejection element 38 is formed with, for example, a piezoelectric element or an electrostatic element. The ejection element 38 deforms an inner wall (diaphragm) of an ink chamber communicating with the nozzle orifice to allow the inner space of the chamber expands and contracts, the deformation being caused by the electrostriction or the electrostatic actuation resulting from an application of a voltage pulse with a predetermined driving waveform to the ejection element 38, thereby ejecting ink droplets. The ejection element 38 may be a heater which heats ink in a nozzle path, thereby utilizing a bubble generated in the ink due to the film boiling to eject the ink droplet from the nozzle orifice. Application of the voltage to the ejection element 38 is controlled by head controlling units 47 to 50 (shown in FIG. 2).

FIG. 2 schematically illustrates an electrical configuration of the printer 11. The printer 11 has an interface 41, a DMA controller 43 serving as a transferring unit, an image processing unit 44 serving as a data generating unit, a non-volatile memory 45, an image buffer 46 serving as a memory, the head controlling units (HCUs) 47 to 50 serving as ejection driving units, and an inspection control unit 51, all of which are interconnected via a bus 52. The head controlling units 47 to 50 are electrically connected to the ejection elements 38 (shown in FIG. 3) each of which corresponds to each of the nozzle orifices of the recording head module 19, and control the voltage to be applied to the ejection elements 38 during printing. The inspection control unit 51 is electrically connected to the nozzle inspection device 37 and controls the nozzle inspection device 37 in accordance with a direction from the controlling unit 42 so as to conduct the nozzle inspection (clogged nozzle orifice detection) at predetermined inspection timings. The nozzle inspection device 37 may employ, as described before, the laser system or the electric field system. Additionally, the controlling unit 42, the image processing unit 44 and the inspection control unit 51 are configured with at least one of CPU and ASIC (application specific IC). The controlling unit 42, the image processing unit 44 and the inspection control unit 51 may be configured with software executed by the CPU which runs programs, with hardware such as an integrated circuit, or with a combination thereof.

The printer 11 receives printing data via the interface 41 from, for example, a host computer (not shown). The received printing data is temporally stored in a receiving buffer (not shown), expanded in the image buffer 46 by the image processing unit 44, and then, transferred to the head controlling units 47 to 50 on a single-scan data (line data) basis, the single-scan data being the data for a single scan by the recording head module 19. Also, the controlling unit 42 translates a command included in the printing data so as to drive and control the carriage motor 18 and the sheet feeding motor 25 (both are shown in FIG. 1) in accordance with the command. By doing so, printing operation and sheet-feeding operation are carried out alternately. Ink droplets are ejected from the nozzle orifices of the recording head module 19 while the carriage 14 is being moved in the main scanning direction X in the printing operation and the recording sheet P is transported at the predetermined pitch in the sheet-feeding operation.

Next, configurations regarding data transferring processing are described in detail. In the transferring processing, inspective ejection data is transferred to the head controlling units 47 to 50 for the purpose of the nozzle orifice inspection.

Figure 6:
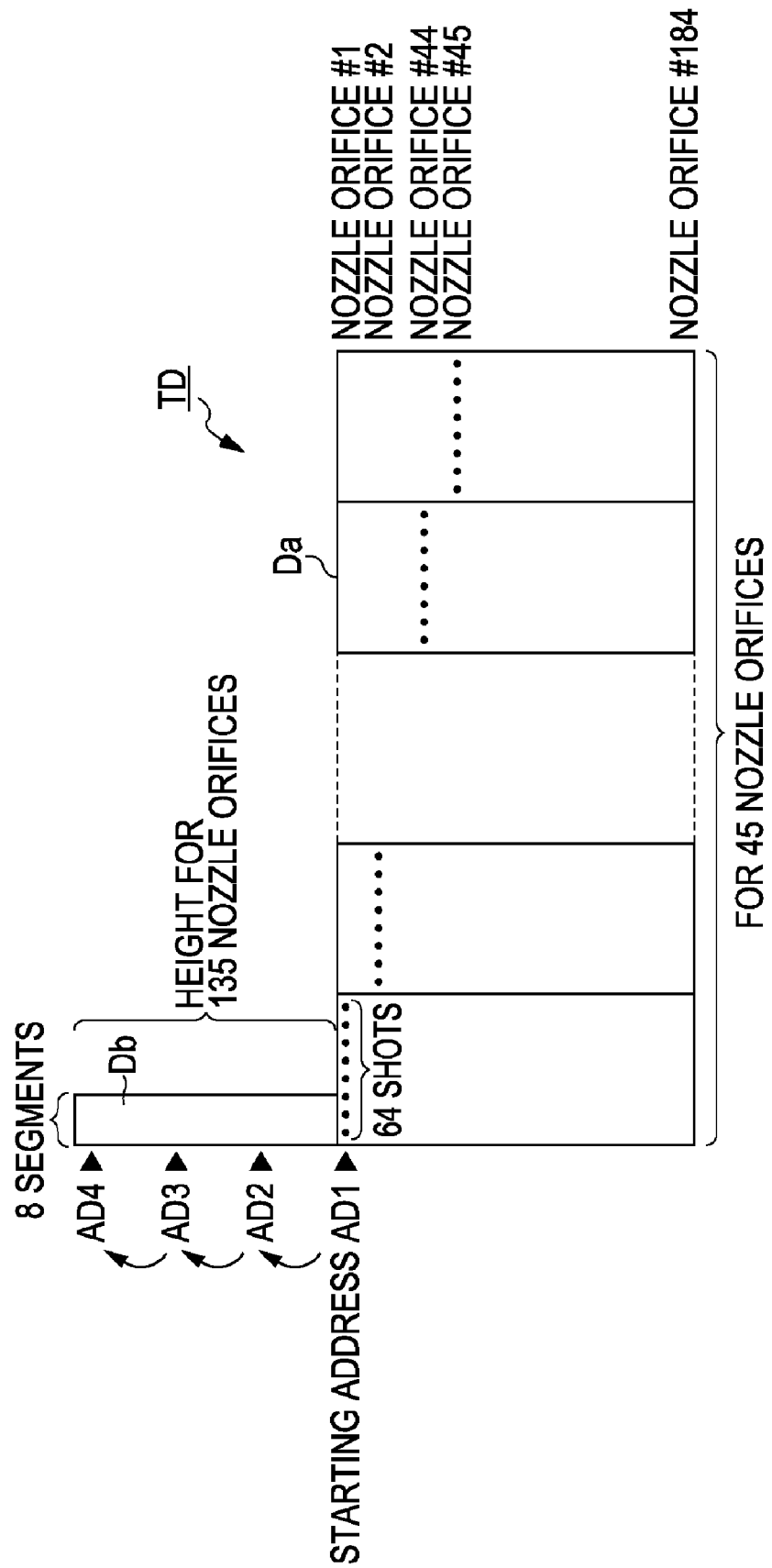
FIG. 6 is a schematic illustration of the inspective ejection data.

The non-volatile memory 45 shown in FIG. 2 stores source data from which the inspective ejection data (inspection printing data) is generated. The source data may be ejection data (bitmap data) itself, or may be data configured with various kinds of information necessary for forming the ejection data. The image processing unit 44 generates the inspective ejection data based on the source data read from the non-volatile memory 45, and loads the inspective ejection data in the image buffer 46. Referring to FIG. 6, a data structure of the inspective ejection data TD stored in the image buffer 46 of FIG. 2 is shown. More specifically, the inspective ejection data TD includes unit ejection data Da and blank data (non-ejection data) Db. The unit ejection data Da is a single inspection data block corresponding to "45 nozzle orifices" which are one fourth of total number of the nozzle orifices (180 nozzle orifices) and the blank data Db extends preceding the unit ejection data Da in a reading direction, being configured with null data which have a data reading width corresponding to "eight segments" and a data length covering "135 nozzle orifices" in the reading direction, as shown in FIG. 6.

Figure 4:
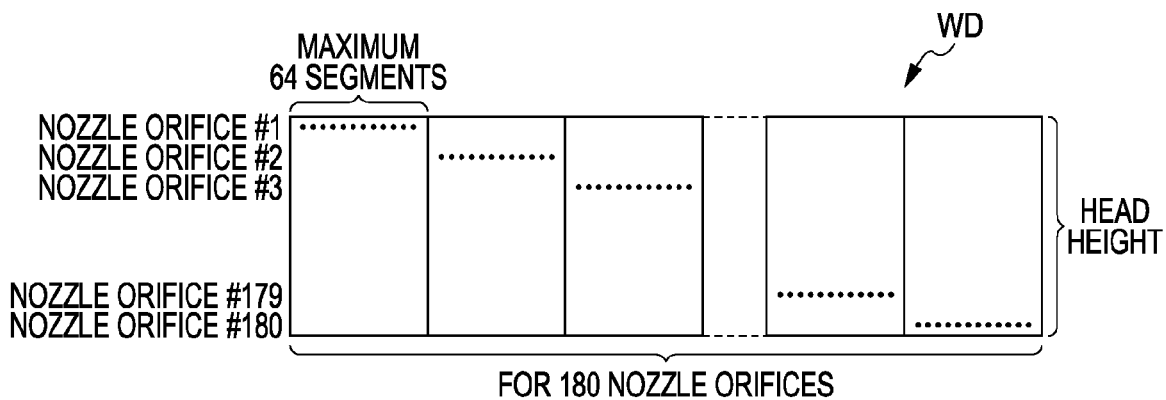
FIG. 4 is a schematic illustration of an entire image of inspective ejection data.

The unit ejection data Da enables the ink droplets for "45 nozzle orifices" to be ejected from the nozzle orifices in an order corresponding to an inspection order in accordance with which the nozzle orifices are inspected. The transfer of the nozzle orifice inspection data is conducted consecutively such that, when each transfer is executed, an initial address (transfer start address) AD1 is shifted by a data length corresponding to "45 nozzle orifices" within a range of the blank data Db. Thus, data of a predetermined data transfer length is read from each of the starting addresses and transferred. The data transfer is repeated a plurality of times (four times in this embodiment) while the starting address AD is shifted, whereby whole inspective ejection data WD which allows all nozzle orifice inspection as shown in FIG. 4 is transferred to the head controlling units 47 to 50. Turning now to FIG. 6, the unit ejection data Da includes ejection-executing data (shown as dots in FIG. 6) in which values "1" are arrayed in the form of a dot pattern to enable a predetermined number M (M=45) of nozzle orifices #1 to #45 to eject ink droplets at different timings. The predetermined number M of the nozzle orifices are one fourth of total number Q (=180) of the nozzle orifices. The area other than the ejection-executing data in the unit ejection data Da is filled with null data (value "0"). The unit ejection data Da has segments corresponding to 64 ejection shots prepared therein per a nozzle orifice, accordingly, desired numbers of shots can be selected and set in a range of maximum 64 shots. The blank data Db has the data width corresponding to eight segments, and besides has a height (data length) corresponding to a certain number of nozzle orifices. The certain number in this case is equal to the remainder when "subtracting a predetermined number M from the total number Q of the nozzle orifices" (in this embodiment, Q−M=135 nozzle orifices). The reason why the data width for the eight segments is employed is that the transferred data has an eight-bit width.

Referring again to FIG. 2, the DMA controller 43 executes direct memory access to transfer (DMA transfer) data in accordance with transferring order from the controlling unit 42, having a starting address set unit 55 (address setting unit) and a transferring counter (e.g. a countdown counter) 56. The starting address set unit 55 allows the starting addresses in the data stored in the image buffer 46 to be written therein. The transferring counter 56 allows the data transfer length to be set therein and is capable of measuring the data length of data being transferred. The controlling unit 42 manages the addresses of the inspective ejection data TD in the image buffer 46. The controlling unit 42, at a predetermined timing for executing the nozzle orifice inspection, writes the starting address AD1 in the starting address set unit 55 to set the address while setting the data transfer length in the transferring counter 56. The controlling unit 42 then directs the DMA controller 43 to transfer data from the image buffer 46 to the head controlling units 47 to 50. The controlling unit 42, upon receipt of notice of completion of the data transfer from the DMA controller 43, changes the starting address ADn set in the starting address set unit 55 into a starting address ADn+1 (n=1,2 and 3) which is shifted upstream of the data in the range of the blank data Db at the interval of the data corresponding to "45 nozzle orifices", and gives a direction to execute the next transfer.

The DMA controller 43 initiates the transfer of the data in the image buffer 46 from the starting address AD as the transferring start position and terminates the transfer when the data length being transferred, which is measured by the transferring counter 56, reaches to the predetermined data transfer length. The DMA controller 43 notifies the controlling unit 42 of the completion of the transfer upon the termination of transfer.

The printer 11 has four head controlling units 47 to 50 provided for respective ink colors (arrays of nozzle orifices). Each of the head controlling units 47 to 50 has basically the same structure as each other, having the same inner structure as the head controlling unit 47 shown in FIG. 2. The head controlling unit 47 will now be described. The head controlling unit 47 has a first memory 58 and a second memory 59 therein. Data transferred from the image buffer 46 to the head controlling unit 47 are selectively stored in the first memory 58 and the second memory 59 alternately for every unit data size of 8 segments×184 nozzle orifices. The first memory 58 and the second memory 59 are connected to a head driving circuit 61 via a data selecting means 60. The data selecting means 60 is configured with, for example, a multiplexer, designed to alternately select the first memory 58 and the second memory 59 from which the data read in accordance with input selection signals (not shown) so as to output the ejection data to the head driving circuit 61.

The head driving circuit 61 is connected to the ejection elements 38 (see FIG. 3) in the recording head module 19 via signal wires 62, the number of the signal wires 62 being equal to the number of the nozzle orifices of the associated color. The ejection data is data in which one segment corresponding to one dot has the length of 1 bit. The nozzle orifices corresponding to data having the value "0" do not allow ink droplets to be ejected therefrom and the nozzle orifices corresponding to data having the value "1" allow ink droplets to be ejected therefrom.

Referring now to FIG. 4, the whole inspective ejection data WD is described. The whole inspective ejection data WD shown in FIG. 4 is data which the head controlling unit 47 receives from the image buffer 46. The head controlling unit 47 applies driving voltages to the ejection elements 38 of the recording head module 19 based on the whole inspective ejection data WD so as to allow each of the nozzle orifices to eject the ink droplet in accordance with a predetermined inspection order i.e. ejection order.

As shown in FIG. 4, the whole inspective ejection data WD includes the ejection data for 180 nozzle orifices, the ejection data for each nozzle orifice having a data length for a head height (nozzle orifices #1 to #180) and a data width for 64 segments. One segment corresponding to one dot has the length of 1 bit in this embodiment. FIG. 4 shows the ejection-executing data in which predetermined numbers of the value "1" are arranged, the predetermined numbers being set as numbers of inspection ejection numbers (shot numbers) per one nozzle orifice of all nozzle orifices each of which has 64 segments, and the data other than the ejection-executing data is set to be data value "0" which indicates absence of ejection. The numbers of the inspection ejection is appropriately set in accordance with systems of nozzle orifice inspection and required detection accuracy.

The more the numbers of the inspection ejection per one nozzle orifice becomes, the higher the detection accuracy of the clogged nozzle orifices of the nozzle inspection device 37 becomes. Accordingly, the numbers of ejection for inspection is set to be more than one to ensure the desired inspection accuracy. For example, when the laser system is employed, a plurality of shots of ink droplets are ejected from each of the nozzle orifices to be inspected while the recording head module 19 is moved relatively to the laser beam, whereby a nozzle orifice from which ink droplets of less than the predetermined numbers are ejected is determined to be a clogged nozzle orifice. Also, when the electric field system is employed, measurement values obtained by a plurality of shots are added up because the change of the electric potential per one shot to be measured is relatively slight, and then, a nozzle orifice of which the total measurement value corresponding thereto is less than a predetermined threshold is determined to be a clogged nozzle orifice.

Figure 5:
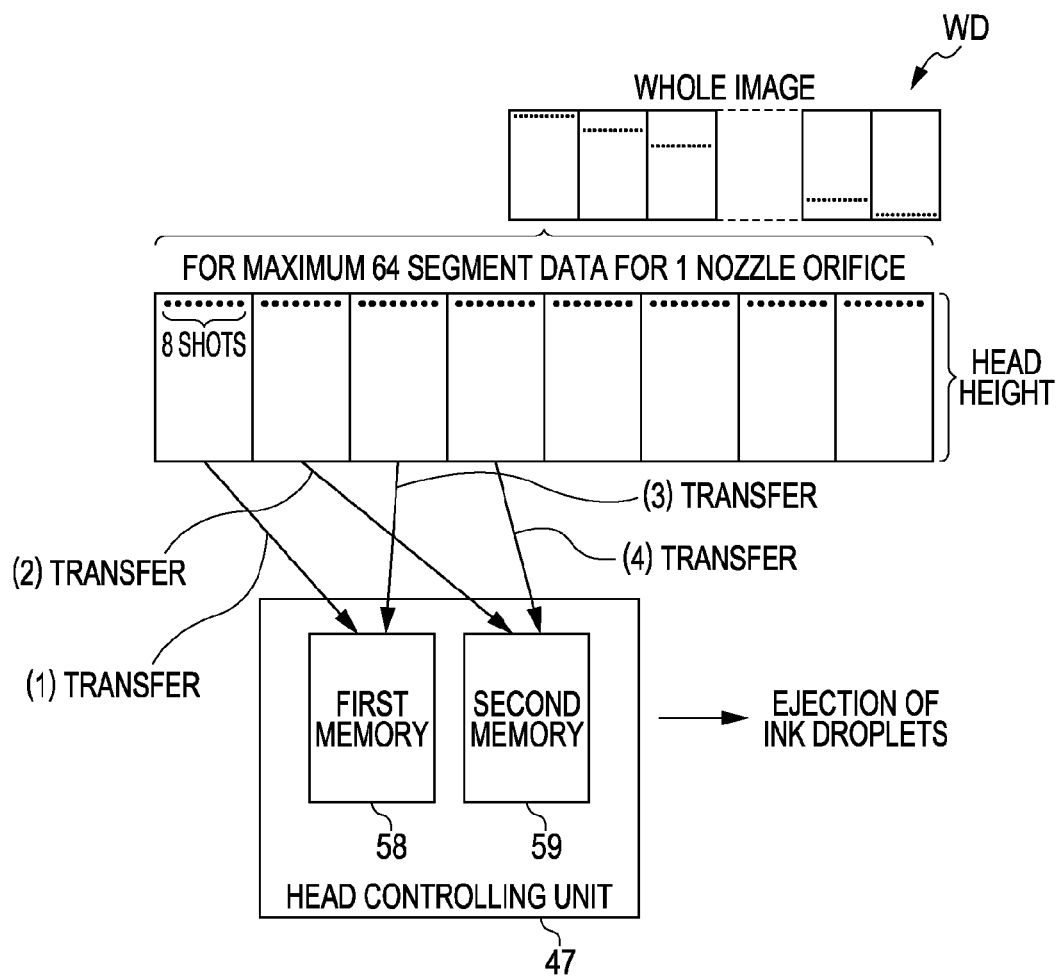
FIG. 5 is a schematic illustration of a data transferring procedure to each memory of a head module control unit.

As shown in FIG. 5, the ejection data for one nozzle orifice having up to 64 segments in the whole inspective ejection data WD is transferred in a manner illustrated in FIG. 5. That is, portions of the ejection data are alternately transferred to the first memory 58 and the second memory 59 in the head controlling unit 47, each of the portions being the ejection data of data widths corresponding to eight shots. This is because both the first memory 58 and the second memory 59 have storage capacities substantially equal to the ejection data for eight-shot ejection.

Storing the whole inspective ejection data WD shown in FIG. 4 transferred to the head controlling units 47 to 50 requires a certain storage capacity. Especially, when the whole inspective ejection data WD including the ejection data for 180 nozzle orifices is stored in the image buffer 46 without being processed, the required size of the storage capacity is calculated from the formula of 64 segments×1 bit×180 nozzle orifices×184 nozzle orifice height≈261 kbyte, being too large in size to be safely prepared. On the other hand, the inspective ejection data TD (inspection data block) which includes the ejection data covering only 45 nozzle orifices is used in a nozzle orifice inspection mode in this embodiment. The starting address is shifted and each ejection data for every 45 nozzle orifices is repeatedly transferred K times (in this embodiment, four times), whereby the whole inspective ejection data WD which enables inspection of all nozzle orifices is received by the head controlling units 47 to 50. Therefore, the device using the inspective ejection data TD requires the storage capacity only enough to store the unit ejection data Da for 45 nozzle orifices and the blank data Db in which the starting address is shifted, the capacity of a memory field prepared in the image buffer 46 being calculated from the following formula of 64 segments×1 bit×45 nozzle orifices× 184 nozzle orifice height+8 segments×1 bit×135 nozzle orifice height≈67 kbyte. As foregoing description, employing the device in the embodiment using the inspective ejection data TD enables required storage capacity to be substantially one fourth of the storage capacity of the device storing the whole inspective ejection data WD for all nozzle orifices.

The data transferring processing under the nozzle orifice inspection will be now described with reference to illustrations for transferring procedure in FIGS. 8 to 11 and a flowchart shown in FIG. 12. The nozzle orifice inspections are executed at the timings when power of the printer 11 is turned on, when a predetermined time interval between the previous and present cleanings is clocked by a cleaning timer (not shown in the figures), and when a cleaning operation switch is turned on by the user.

The controlling unit 42 orders the image processing unit 44 to generate the inspective ejection data TD upon arrival of the timing of the nozzle orifice inspection. In accordance with the order, the image processing unit 44 reads the source data for the inspection from the non-volatile memory 45, generates the inspective ejection data TD shown in FIG. 6 based on the source data, and writes the data into the image buffer 46 (step S10). More specifically, the image processing unit 44 generates the unit ejection data Da based on the source data, adds the blank data Db continuously to the unit ejection data Da at upstream thereof in the reading direction so as to generate the inspective ejection data TD, and writes the inspective ejection data TD in the image buffer 46.

The controlling unit 42 sets "J=1" in the transferring counter 56 (step S20). Then, the controlling unit 42 sets the starting address AD in the starting address set unit 55 of the DMA controller 43 (step S30). The starting address AD is calculated from the formula AD=AD1−(J−1)·Nk. The formula J=1 holds in the first data transfer, therefore the formula AD=AD1 holds. Additionally, "Nk" is address value for "45 nozzle orifices" and "45" is substituted for Nk in this embodiment.

Also, the controlling unit 42 sets the data transfer length in the DMA controller 43 (step S40). More specifically, the controlling unit 42 sets the data transfer length in a single transfer of the inspection data block in the transferring counter 56. In this embodiment, the data transfer length is set to be 62 kbyte which is calculated from the formula 64 segments×1 bit×45 nozzle orifices×184 nozzle orifice height≈62 kbyte.

Then, the controlling unit 42 orders the DMA controller 43 to execute the direct memory access to transfer (DMA transfer) the data (step S50). Accordingly, the DMA controller 43 transfers a portion of the inspective ejection data TD stored in the image buffer 46 to the head controlling unit 47. The portion of the inspective ejection data obtained by reading the data from the starting address AD1 has the data length of the data transfer length. Each data is transferred, showing the eight-bit width and the data length covering 184 nozzle orifice height, and stored alternately in the first memory 58 and the second memory 59 of the head controlling unit 47 (see FIG. 5).

FIGS. 8 to 11 are schematic views illustrating the data transferring procedure. FIG. 8, FIG. 9, FIG. 10 and FIG. 11 show the inspection data block in the first, second, third and fourth data transferring procedure, respectively. In these figures, one nozzle orifice corresponds to 32 segments, for the sake of convenience of illustration.

Figure 8:
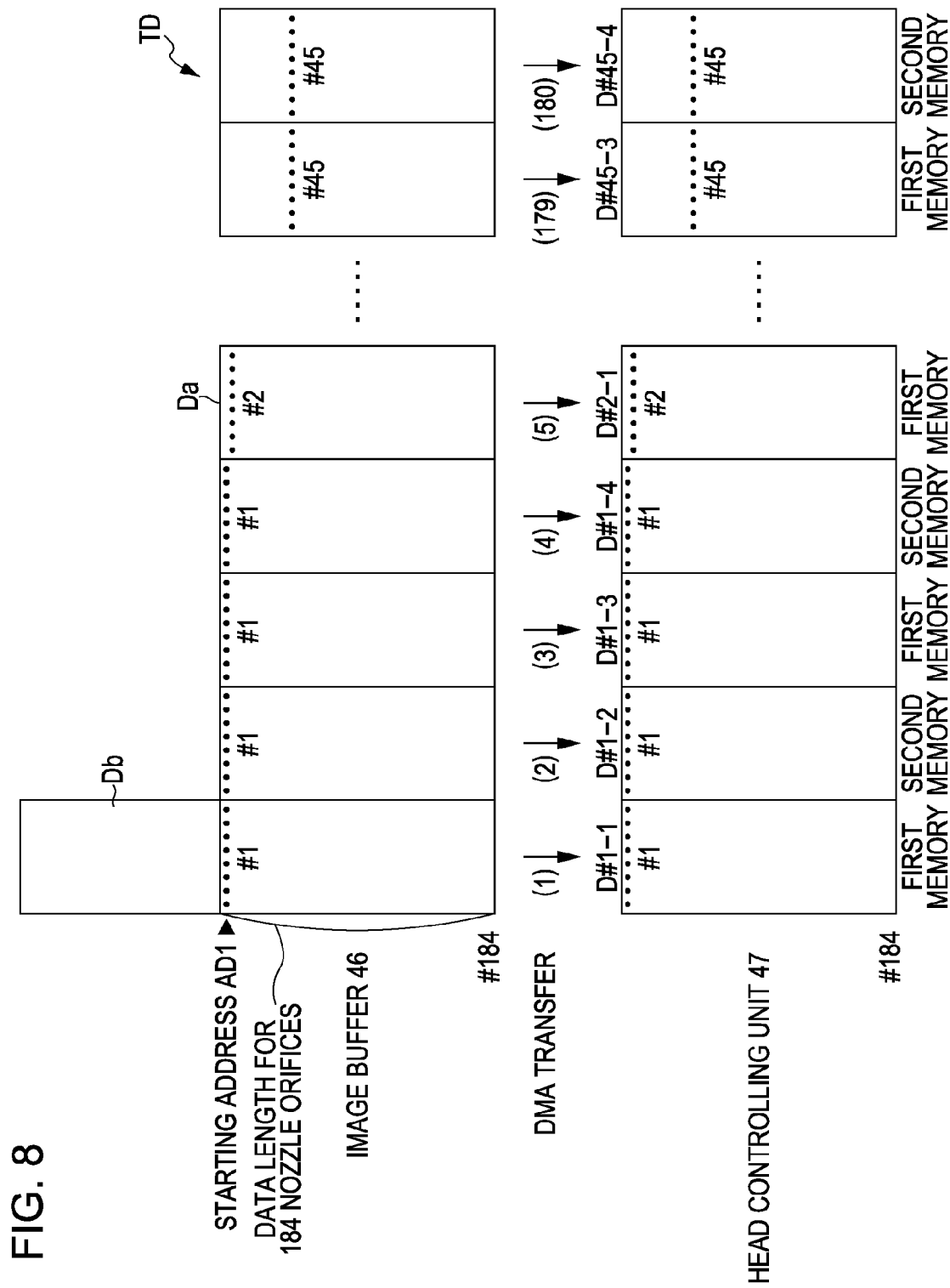
FIG. 8 is a schematic illustration of the first data transferring procedure to the head module control unit.

In the first transfer of the inspection data block, the data having the data length of the data transfer length is read from the memory starting from the starting address AD1 of the data in the image buffer 46 and transferred directly to the head controlling unit 47 as shown in FIG. 8. In other words, the data is read from the beginning (#1) of the unit ejection data Da, and then, the unit ejection data Da with no blank data Db included is transferred.

Consequently, the ejection data D#1-1, D#1-2, D#1-3, D#1-4, D#2-1 ... D#45-3, and D#45-4 are sequentially stored in the first memory 58 and the second memory 59 alternately. Transferring four columns of the data each having the width of 8 bits results in the transfer of the data of 32 segment width per one nozzle orifice. Here, the first three characters of the reference symbols "D#1-2" indicate the nozzle orifice denoted by the symbol #1 and the last numerical character of the reference symbols "D#1-2" indicates the second column out of the four columns of the transfer data. In this embodiment, the first and third (odd number) columns are stored in the first memory 58; on the other hand, the second and fourth (even number) columns are stored in the second memory 59. Then, the head driving circuit 61 drives the ejection elements 38 of the recording head module 19 in accordance with the ejection data alternately read from the first memory 58 and the second memory 59 via the data selecting means 60. By doing so, the predetermined numbers of shots of ink droplets are ejected from the nozzle orifices #1 to #45 sequentially, the predetermined numbers being not more than the maximum shot numbers. The inspection control unit 51 operates the nozzle inspection device 37, which is synchronized with the ejection of the ink droplets. The inspection of the clogged nozzle orifice (missing ink dot) among the nozzle orifices #1 to #45 is executed by detecting the presence of the ejected ink droplet.

Then, the controlling unit 42 determines whether J=K or not, in other words, whether all the order to conduct ejections of the ink droplets from all the nozzle orifices to be inspected are executed (step S60). Here, K indicates the necessary number of the transfer for executing inspection of all the nozzle orifices, K being "4" (=the total number of the nozzle orifices Q/the predetermined number of the nozzle orifices M, i.e. 180/45) in this embodiment. When J is equal to K (J=K, K is the number of the transfer to complete the inspection), the controlling unit 42 terminates the processing, on the other hand, when J is not equal to K, the controlling unit 42 changes the value J to J+1 (step S70).

Subsequent to the foregoing steps, the controlling unit 42 determines whether the controlling unit 42 received the notice of the completion of the data transfer from the DMA controller 43 (step S80). The DMA controller 43 sends the notice every time when the controller 43 finishes transferring the data of the inspection data block for the single transfer. Upon receipt of the notice, the controlling unit 42 sets the next starting address (step S30). The next starting address AD2 in the second transfer of the inspection data block is set to hold the formula AD2=AD1−Nk. In other words, the starting address AD2 is set to be younger (located upstream of the data) than the starting address AD1 of the first transfer of the inspection data block by "Nk (=45)". Then, after setting the same value as the value of the previous transfer in the transferring counter 56 as the data transfer length (step S40), the controlling unit 42 orders the DMA controller 43 to conduct the data transfer (step S50).

Figure 9:
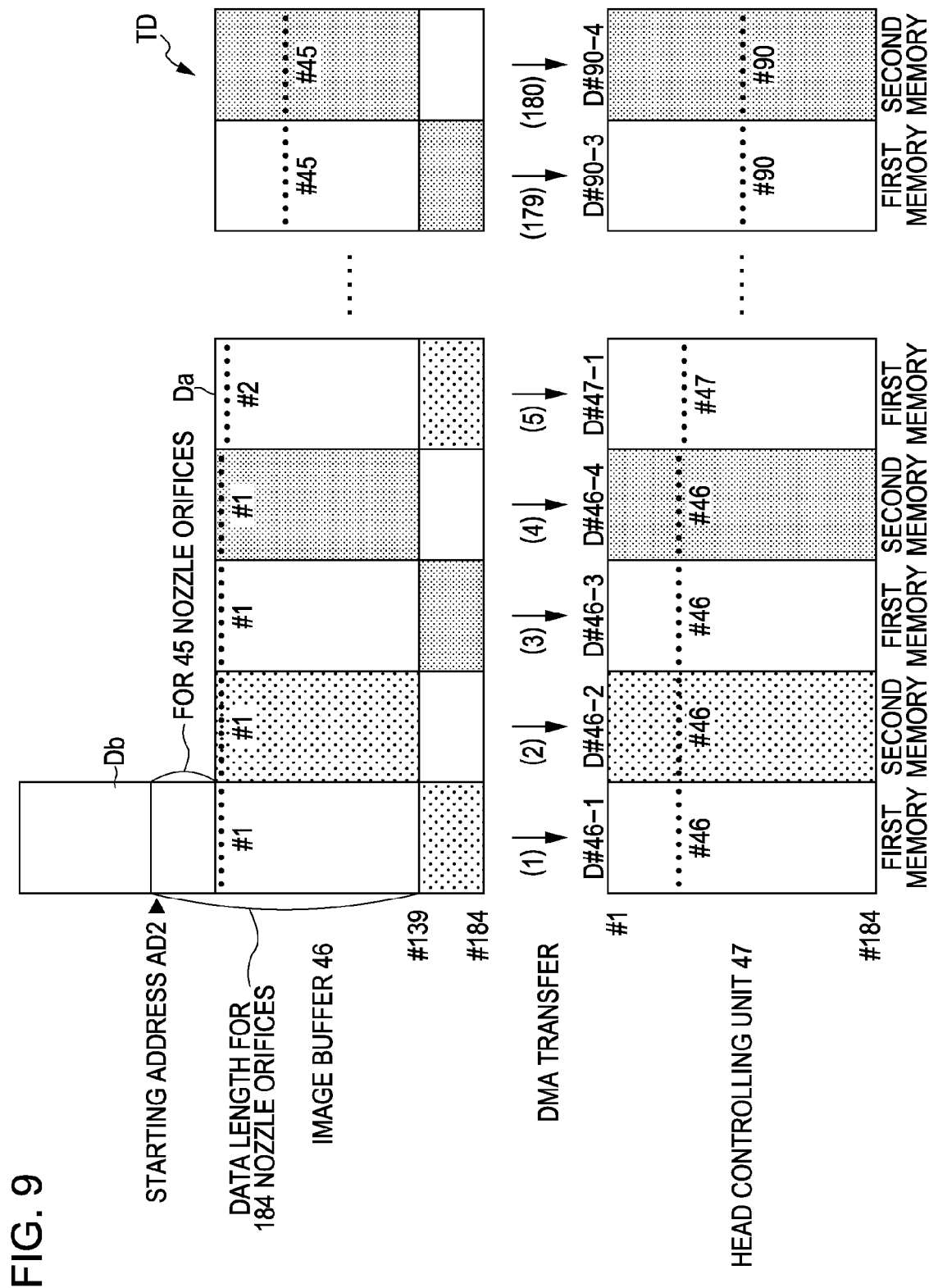
FIG. 9 is a schematic illustration of the second data transferring procedure to the head module control unit.

In the second transfer of the inspection data block, the data having the data length of the data transfer length is read from the memory starting from the starting address AD2 of the data in the image buffer 46 and transferred directly to the head controlling unit 47, as shown in FIG. 9. More specifically, the data is read from the memory starting from the starting address AD2 which is younger than the starting address AD1 of the inspective ejection data TD by "Nk (=45)". The transfer data includes null data of the blank data in the beginning area thereof, the null data corresponding to the 45 nozzle orifices. Therefore, all the ejection-executing data for the nozzle orifices #1 to #45 are sent, being positioned shifted downstream of the data by "45 nozzle orifices data" comparing to the first transfer data because they are read from the memory starting from the starting address AD2.

By doing so, the ejection data D#46-1, D#46-2, D#46-3, D#46-4, D#47-1 . . . D#90-3, and D#90-4 are sequentially sent to the head controlling unit 47 so as to be stored in the first memory 58 and the second memory 59 alternately. Then, the head driving circuit 61 drives the ejection elements 38 of the recording head module 19 in accordance with the ejection data alternately read from the first memory 58 and the second memory 59, so that the predetermined numbers of shots of ink droplets are sequentially ejected from the nozzle orifices #46 to #90, the predetermined numbers being no more than the maximum shots numbers. During this procedure, the nozzle inspection device 37 detects the presence of the ejection of the ink droplets, and hence, the clogged nozzle orifice (missing ink dot), if any, of the nozzle orifices #46 to #90. Note that the data before the transfer and the associated data after the transfer have the same hatching as shown in FIG. 9.

Figure 12:
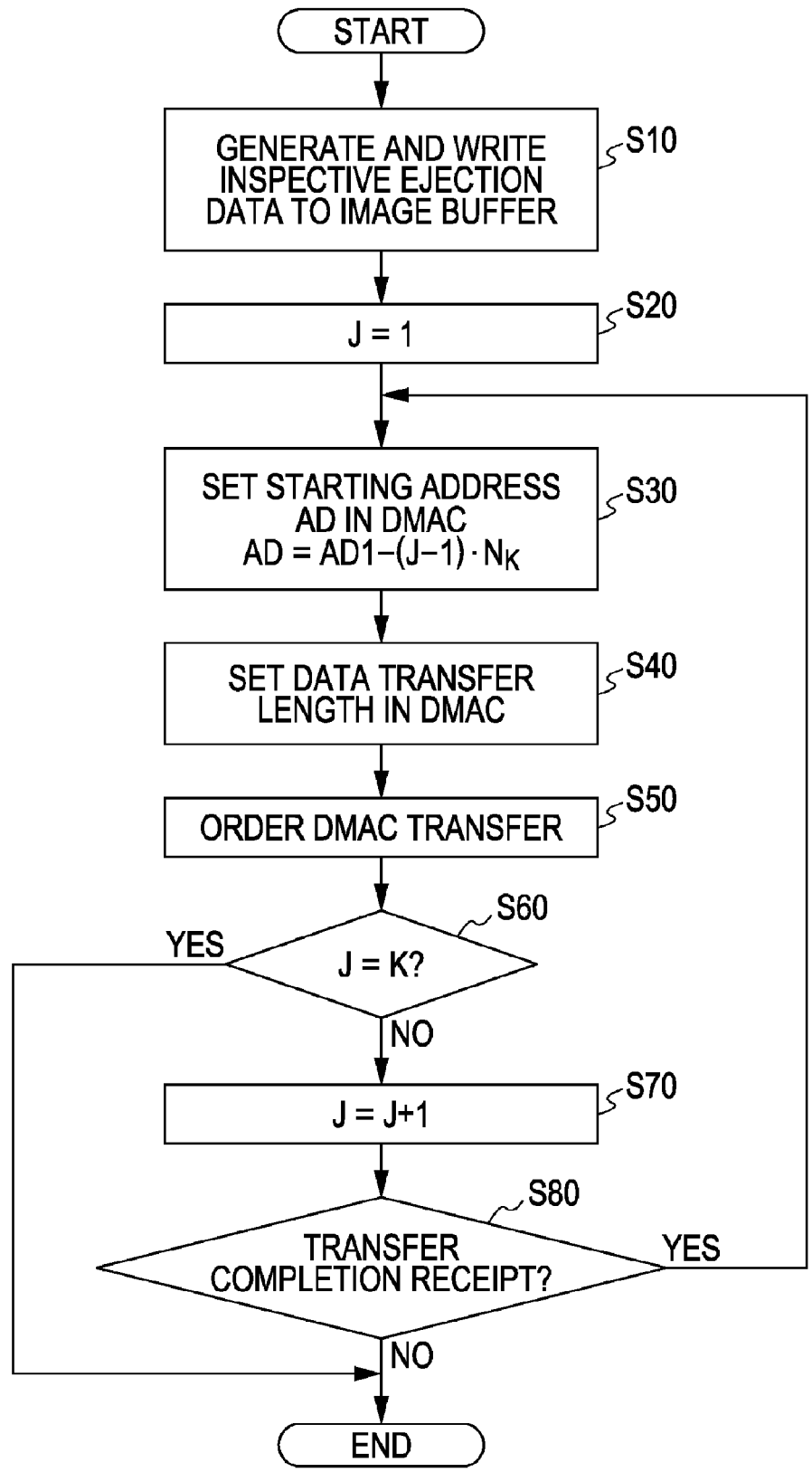
FIG. 12 is a flowchart illustrating the data transferring procedure.

In this second transfer, in the step S60 of FIG. 12, it is determined that J=2, or J is not equal to K (K=4), therefore, the controlling unit 42 changes J to 3 (J=J+1) in the step S70. Upon the receipt of the notice of the completion of the data transfer (step S80), the controlling unit 42 sets the starting address to be AD3=AD1−2·Nk (step S30). In other words, the controlling unit 42 sets a starting address AD3 which is shifted upstream of the data from the starting address AD2 of the second transfer of the inspection data block at the interval of the data corresponding to "45 (i.e. Nk)" nozzle orifices. Then, the controlling unit 42 sets the same value as the value of the previous transfer in the transferring counter 56 as the data transfer length (step S40). After that, the controlling unit 42 orders the DMA controller 43 to conduct the data transfer (step S50).

Figure 10:
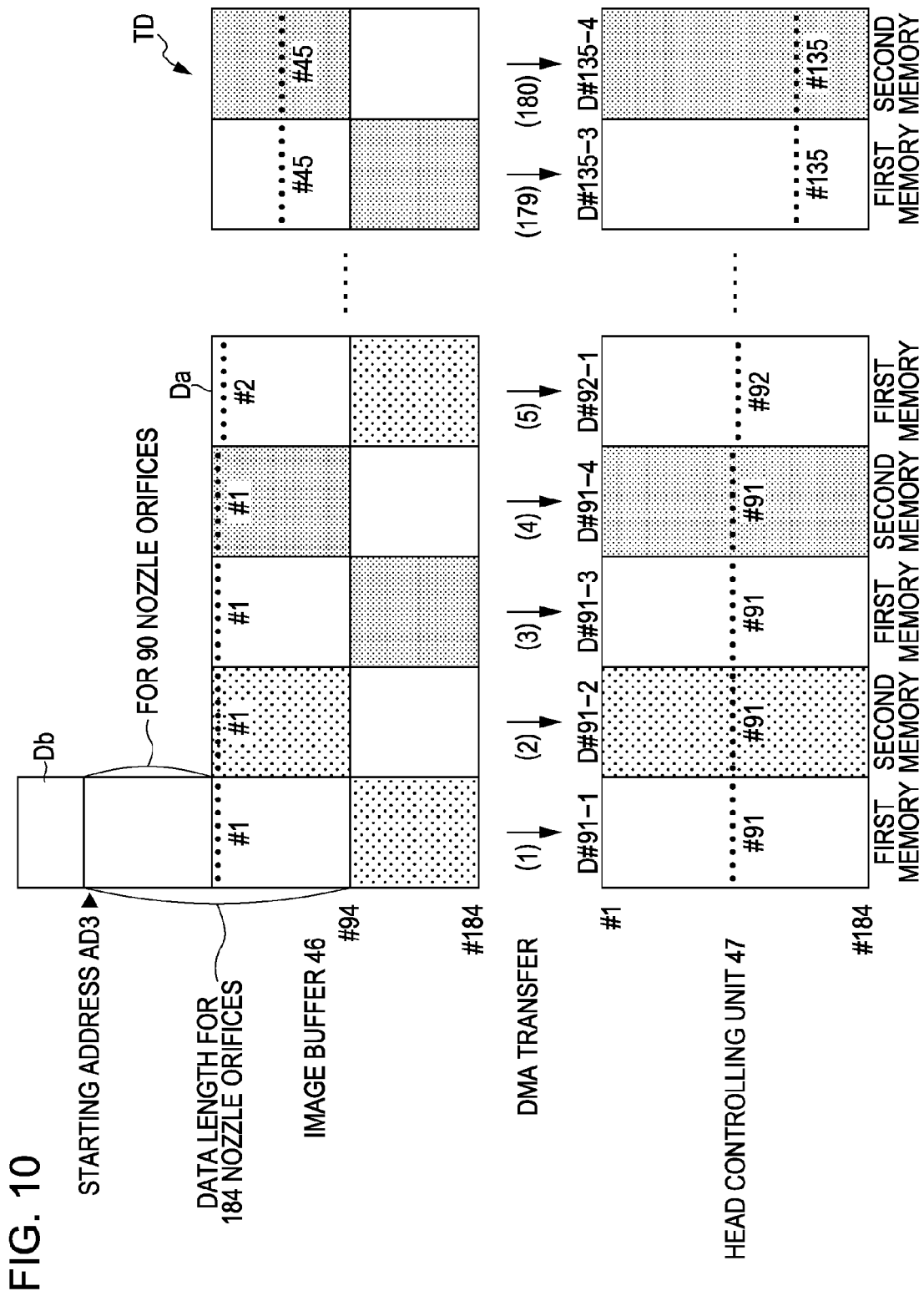
FIG. 10 is a schematic illustration of the third data transferring procedure to the head module control unit.

In this third transfer of the inspection data block, the data having the data length of the data transfer length is read from the memory starting from the starting address AD3 of the data in the image buffer 46 and transferred directly to the head controlling unit 47, as shown in FIG. 10. More specifically, the data is read from the memory starting from the starting address AD3 which is younger than the starting address AD1 of the inspective ejection data TD by "2Nk (=90 nozzle orifices)". The transfer data includes null data of the blank data Db in the beginning area of the data, the null data corresponding to data for 90 nozzle orifices. Therefore, all the ejection-executing data for the nozzle orifices #1 to #45 are sent, being positioned shifted downstream of the data by "90 nozzle orifices data" comparing to the first transfer data because they are read from the memory starting from the starting address AD3.

Consequently, the ejection data D#91-1, D#91-2, D#91-3, D#91-4, D#92-1 . . . D#135-3, and D#135-4 are sequentially stored in the first memory 58 and the second memory 59 alternately. Then, the head driving circuit 61 drives the ejection elements 38 of the recording head module 19 in accordance with the ejection data alternately read from the first memory 58 and the second memory 59. By doing so, the predetermined numbers of shots of ink droplets are ejected from the nozzle orifices #91 to #135 sequentially, the predetermined numbers being not more than the maximum shot numbers. During this procedure, the nozzle inspection device 37 detects the presence of the ejection of the ink droplets, and hence, the clogged nozzle orifice (missing ink dot), if any, of the nozzle orifices #91 to #135.

In this third transfer, in the step S60 of FIG. 12, it is determined that J=3, or J is not equal to K (K=4), therefore, the controlling unit 42 changes J to 4 (J=J+1) in the step S70. Then, upon the receipt of the notice of the completion of the data transfer (step S80), the controlling unit 42 sets the starting address to be AD4=AD1−3·Nk (step S30). In other words, the controlling unit 42 sets a starting address AD4 which is shifted upstream of the data from the starting address AD3 of the third transfer of the inspection data block at the interval of the data corresponding to "45 (i.e. Nk)" nozzle orifices. Then, the controlling unit 42 sets the same value as the value of the previous transfer in the transferring counter 56 as the data transfer length (step S40). After that, the controlling unit 42 orders the DMA controller 43 to conduct the data transfer (step S50).

Figure 11:
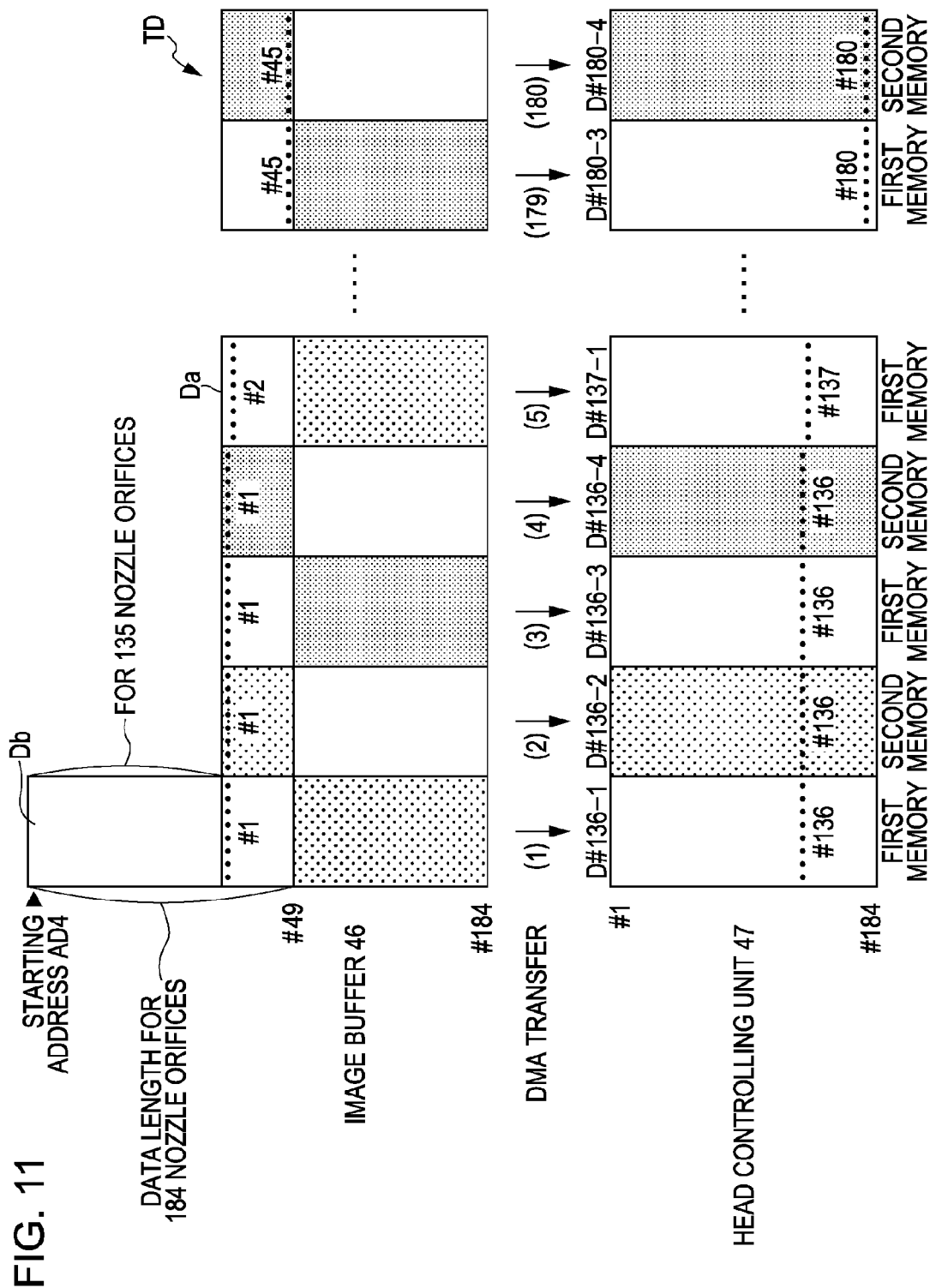
FIG. 11 is a schematic illustration of the fourth data transferring procedure to the head module control unit.

In this fourth transfer of the inspection data block, the data having the data length of the data transfer length is read from the memory starting from the starting address AD4 of the data in the image buffer 46 and transferred directly to the head controlling unit 47, as shown in FIG. 11. More specifically, the data is read from the memory starting from the starting address AD4 which is younger than the starting address AD1 of the inspective ejection data TD by "3Nk (=135 nozzle orifices)". The transfer data includes null data of the blank data Db in the beginning area of the data, the null data corresponding to data for 135 nozzle orifices. Therefore, all the ejection-executing data for the nozzle orifices #1 to #45 are sent, being positioned shifted to downstream of the data by "135 nozzle orifices data" comparing to the first transfer data because they are read from the memory starting from the starting address AD4.

Consequently, the ejection data D#136-1, D#136-2, D#136-3, D#136-4, D#136-1 . . . D#180-3, and D#180-4 are sequentially stored in the first memory 58 and the second memory 59 alternately. Then, the head driving circuit 61 drives the ejection elements 38 of the recording head module 19 in accordance with the ejection data alternately read from the first memory 58 and the second memory 59. By doing so, the predetermined numbers of shots of ink droplets are ejected from the nozzle orifices #136 to #180 sequentially, the predetermined numbers being not more than the maximum shot numbers. During this procedure, the nozzle inspection device 37 detects the presence of the ejection of the ink droplets, and hence, the clogged nozzle orifice (missing ink dot), if any, of the nozzle orifices #136 to #180.

Figure 7:
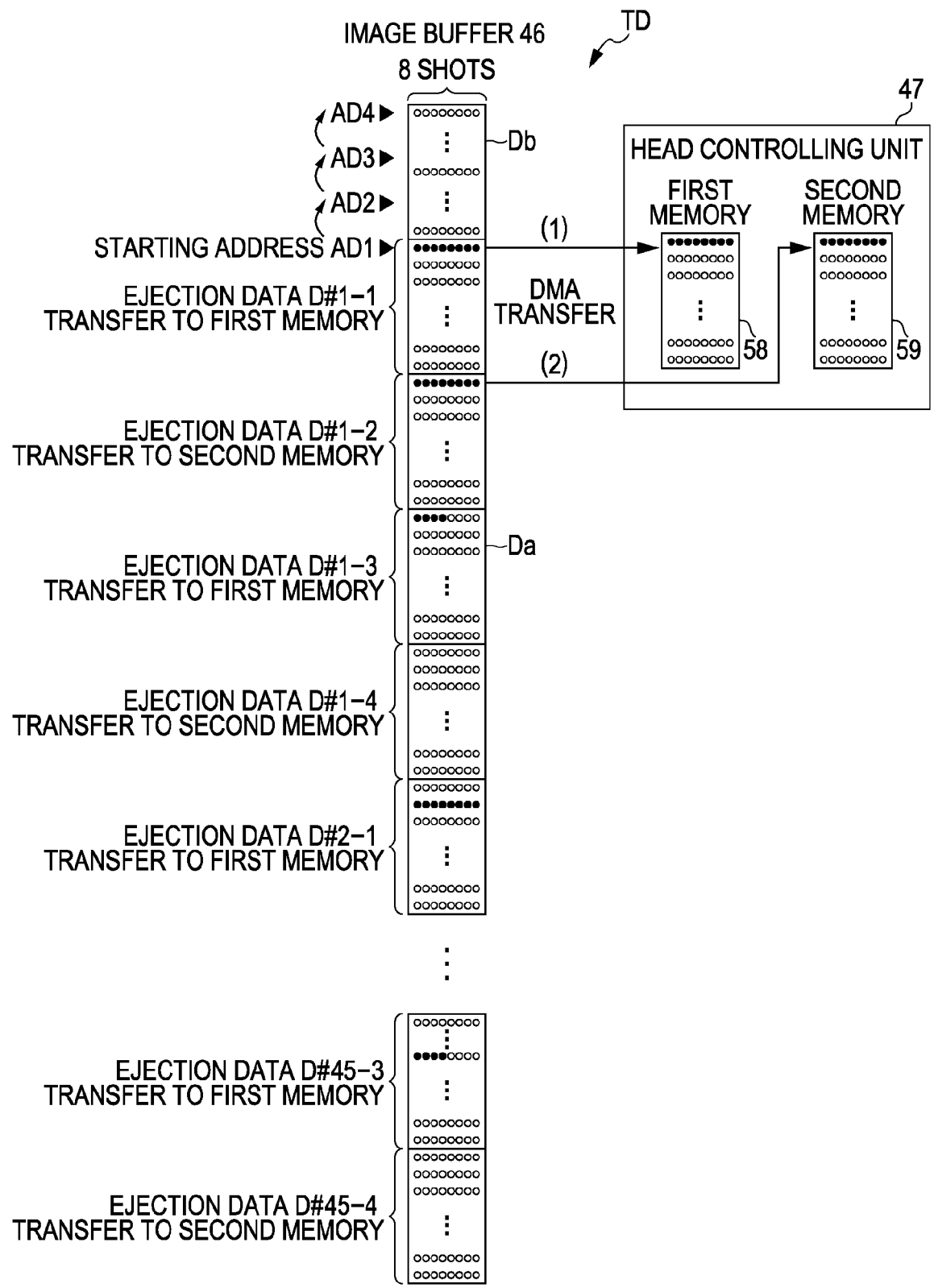
FIG. 7 is a schematic illustration of an inspective ejection data transferring procedure to the head module control unit.

FIG. 7 illustrates the data transferring processing as an example in which the number of segment per one nozzle orifice is set to be 32 and the number of ejection is set to be "20 times". The starting address AD1 is designated in the first data transfer of the inspection data block as shown in FIG. 7. In the figure, black dots indicate the ejection data (data value "1") and white dots indicate the non-ejection data (data value "0"). At first, the ejection data D#1-1 is transferred to the first memory 58, whereby ejection of the ink droplet from the nozzle orifice #1 is executed for eight times. Secondly, the ejection data D#1-2 is transferred to the second memory 59, whereby ejection of the ink droplet from the nozzle orifice #1 is executed for eight times. Next, the ejection data D#1-3 is transferred to the first memory 58, whereby ejection of the ink droplet from the nozzle orifice #1 is executed for four times. Following these transfers, the ejection data D#1-4 is transferred to the second memory 59, however, ejection of the ink droplet is not executed because the data transferred are null data. As described before, ink droplet ejection is executed for 20 times. Likewise, ejection data of the nozzle orifices #2 to #45 are sequentially transferred, whereby the ink droplet is ejected 20 times from each of the nozzle orifices #2 to #45. Then, the starting address AD is sequentially shifted upstream of the data in the reading direction at an interval corresponding to the predetermined number M so as to set the starting addresses AD2 to AD4, the transferring processing is repeated at every shift of the starting address. By doing so, the ink droplet is ejected 20 times from each of the nozzle orifices #46 to #180. As described before, the ink ejection is executed predetermined number (set shots number) of times, the predetermined numbers being not more than the maximum segment numbers Smax (the maximum shot numbers) in the embodiment.

Since J becomes equal to K ("YES" in S60 of FIG. 12) after ordering the Kth data transfer, the controlling unit 42 completes the transferring processing. In the foregoing description, the data transferring processing of the inspective ejection data is illustrated for a specific color of the nozzle orifices, however, the same transferring processing is executed, the ejection data being transferred from the image buffer 46 to the head controlling units 48 to 50 in the inspection of the nozzle orifices for ink droplets of other colors. Consequently, the predetermined shots of ink droplets are ejected from other arrays of the nozzle orifices, whereby the nozzle inspection device 37 executes the nozzle orifice inspection for the other arrays of nozzle orifices likewise.

As in the foregoing detailed description, the following advantages are obtained in this embodiment.

(1) The inspection data is generated with the unit ejection data Da and the blank data Db. The unit ejection data Da is the data corresponding to the predetermined number of nozzle orifices, the predetermined number being less than the number of all nozzle orifices. The blank data Db is added to the unit ejection data Da, corresponding to the 135 nozzle orifices (all nozzle orifices to be inspected "180" in the number–the predetermined nozzle orifices "45" in the number). With this inspection data of small data amount, the transfer of the inspection data block is repeated a plurality of times, while the starting address AD (the position from which the transfer starts) is shifted at the interval of the data corresponding to "45" nozzle orifices, whereby using the inspective ejection data TD which has a relatively small data size enables the transfer of the whole inspective ejection data WD to the head controlling unit 47. Therefore, storage area for the inspective ejection data TD is downsized to be one fourth of the storage area for the whole inspective ejection data WD stored as it is.

(2) A plurality number of segments, the number being a multiple of eight (in the embodiment, 64 segments or 32 segments), are prepared for one nozzle orifice so that ejection can be conducted a plurality of times, whereby the times of ejection from one nozzle orifice are set as appropriate in a range of the number of the segments. Therefore, it is possible to use a common inspective data, program and hardware between printers of different models, between inspection devices of different inspection systems, and between nozzle orifice detection devices of different required detection accuracy.

(3) The predetermined number M is set to be the same value as the quotient of total number of the nozzle orifices Q and a natural number N, N being more than one. Therefore, simply repeating Q/M times of the data transfers implements necessary ink droplets ejection for the inspection of all nozzle orifices.

(4) The inspective ejection data is configured such that a plurality of the ejection-executing data "1" for the nozzle orifice of the same nozzle orifice number are continuously arranged, so that ejection of the ink droplets from one orifice is executed a plurality of times, whereby the high accuracy inspection is possible even when using the device employing the electrical field system.

Note that the before described embodiment is not exclusive and the following modifications may be employed.

(First Modification)

Figure 13A:
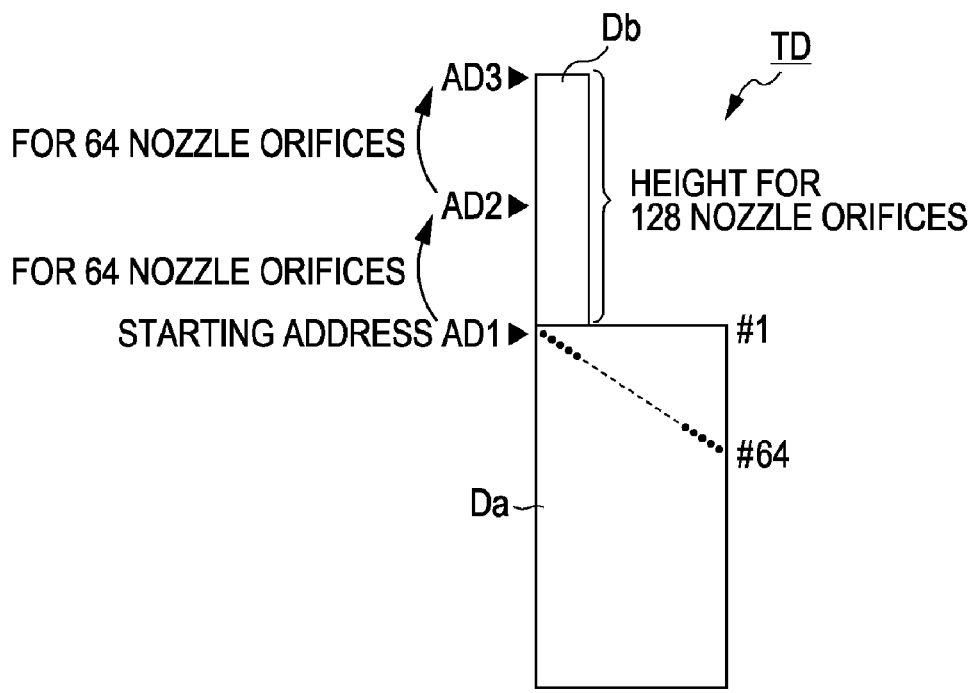
FIG. 13A is a schematic illustration of a data transferring procedure in a modification.
Figure 13B:
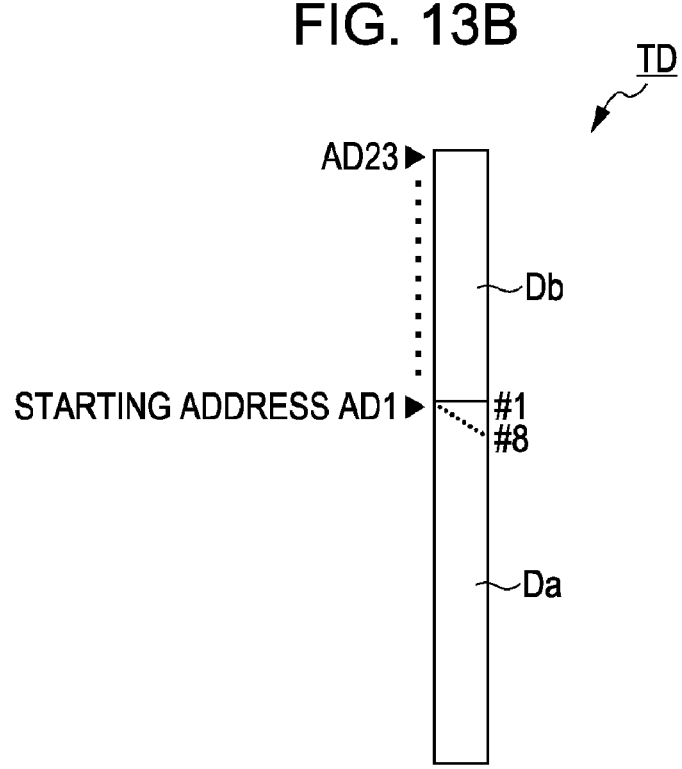
FIG. 13B is a schematic view illustrating a data transferring procedure in another modification.

The inspective ejection data TD is configured to be the data for executing a plurality of continuous ejections of ink droplet from the nozzle orifice of the same nozzle orifice number, however, the configuration of the data is not limited. For example, another inspective ejection data may be employed, being data for executing one ejection of ink droplet from one nozzle orifice as shown in FIGS. 13A and 13B. Here, FIG. 13A illustrates a structure of data with which the predetermined numbers M (M being 64) of data is transferred a plurality of times (three times). On the other hand, FIG. 13B illustrates a structure of data with which the predetermined numbers M (M being 8) of data is transferred a plurality of times (23 times). In FIG. 13A, the blank data Db has a height for "128" nozzle orifices and starting addresses AD1 to AD3 are sequentially shifted at an interval of the data for "64 nozzle orifices", so that the data transfer is executed three times. On the other hand, in FIG. 13B, the blank data Db has a height for "172" nozzle orifices and starting addresses AD1 to AD23 are sequentially shifted at an interval of the data corresponding to "8 nozzle orifices", so that the data transfer is executed 23 times.

(Second Modification)

Figure 14:
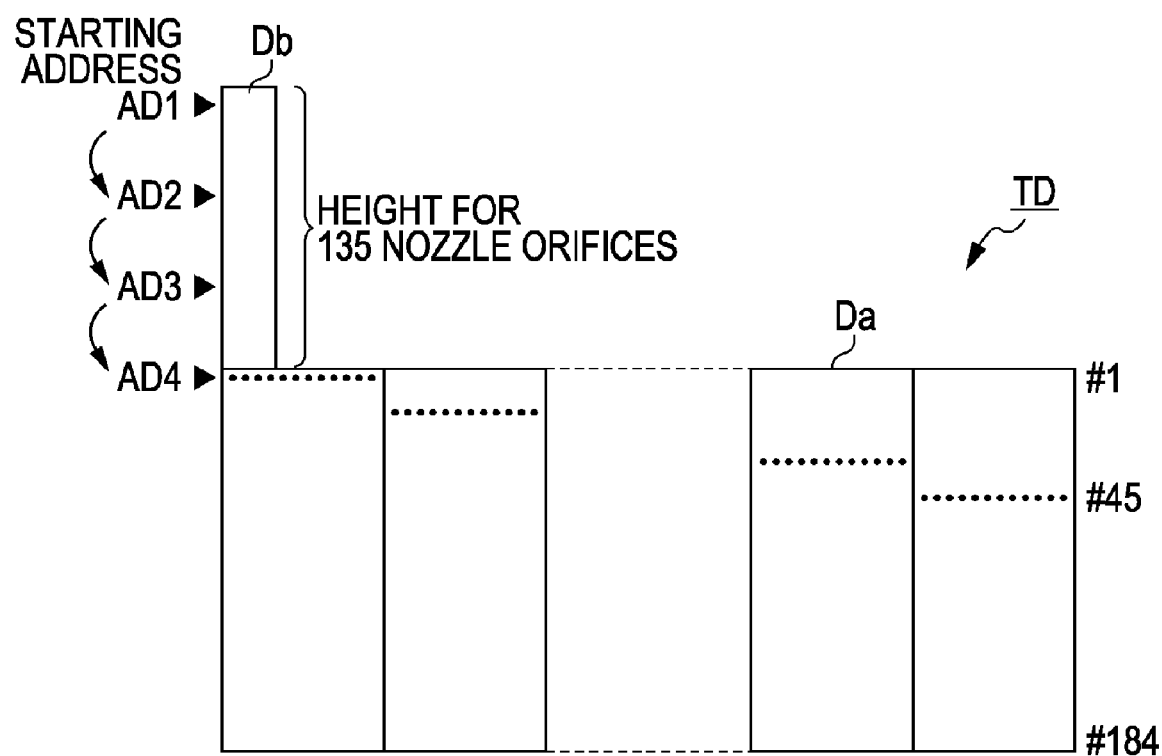
FIG. 14 is a schematic illustration of a data transferring procedure in still another modification different from those shown in FIGS. 13A and 13B.

The direction in which the starting address AD is shifted is not limited to the upstream of the data reading direction. The starting address AD1 may be set at the beginning of the blank data Db and may be shifted downstream at an interval of the data corresponding to predetermined number M in the data reading direction as the number of the transfer increases, as shown in FIG. 14. Also, the starting address AD may be shifted not only in one direction but also in random directions, as long as overlapping of the starting address AD is avoided. For instance, the starting address AD may be shifted in the following order: the starting address AD1; the starting address AD4; the starting address AD2 and the starting address AD3 in FIG. 6 or FIG. 14.

(Third Modification)

The unit ejection data is not limited to the structure such that the ejection-executing data (e.g. "1") are arranged in an ascending order (#1, #2, #3, . . . #45) of the nozzle orifice numbers, the ejection-executing data being arrayed by data corresponding to a single ejection or continuous plurality of ejections for each nozzle orifice. In other words, positions of the ejection-executing data (for example, "1") in the unit ejection data may vary for all nozzle orifices #1 to #45 to be inspected, as long as the positions are arranged in a manner in which at least one ejection from each of all nozzle orifices can be conducted. Also, the numbers of the ejection may be different between each of the nozzle orifices. For instance, a specific nozzle orifice (e.g. a nozzle orifice having a nozzle orifice number of multiples of 5) may eject ink droplets more or less than other nozzle orifices. Additionally, the predetermined number M of the ejection-executing data "1" may be arranged randomly in the unit ejection data Da, as long as the ejection from all the nozzle orifices are ordered.

(Fourth Modification)

Applications of the ejection of the ink droplets are not exclusively employed in the nozzle orifice inspection device.

For example, the applications of the ink droplets may be employed for printing a pattern for checking the nozzle orifices, when the pattern for checking the nozzle orifices is printed, the printed results being visually investigated by an investigator or being read by an image reading system (such as a CCD camera) for an image analysis to detect a clogged nozzle orifice.

(Fifth Modification)

In the embodiment described before, the number of the segments are set to be 64 or 32, however, the number of the segments per one nozzle orifice may be appropriately changed. The number of the segments is adjusted when the inspective ejection data is generated in accordance with the number of the ejection per one nozzle orifice. For instance, when the number of the ejection is 8 or less, 16 or less and 32 or less; 8 segment data per one nozzle orifice, 16 segment data per one nozzle orifice, 32 segment data per one nozzle orifice are generated, respectively. Furthermore, when the number of the ejection is more than 32, 64 segment data per one nozzle orifice is generated.

(Sixth Modification)

A method, in which a plurality of ejections from one nozzle orifice is started after a plurality of ejections from the previous nozzle orifice is completed, is employed as a method for the inspective ejection. However, a method in which pluralities of processing are repeated may be employed. The processing is configured to execute every one ejection per one nozzle orifice at each of timings for corresponding ejection from all the nozzle orifices, the timings being varied. For example, the method is suitably used when the number N of the inspection is increased to improve the accuracy of the nozzle orifice inspection after the same nozzle orifice is inspected a plurality of times (N times).

(Seventh Modification)

The inspective ejection data is not limited to be 1 bit per one segment, but may be a plurality of bits per one segment. For instance, an amount of ink droplets ejected may be variable and data of a level corresponding to the amount may be set to be 2 bits or 3 bits per one segment.

(Eighth Modification)

The predetermined number in the embodiment is the value obtained by dividing the number of all nozzle orifices by the natural number of one or more, that is, the predetermined number is the number capable of dividing the number of all the nozzle orifices. However, the predetermined number may be the number not capable of dividing the number of all nozzle orifices. For example, the predetermined number may be set to be "50" for the total number of nozzle orifices "180". In this case, the data is desirably configured such that transferring is executed a plurality of times more than the value obtained by dividing 180 by 50 (180/50=3.6), i.e. four times. In this case, 30 dot data out of 50 dot data are used in ejections and 20 dot data which do not have the associating nozzle orifices are not be used in the last transfer.

(Ninth Modification)

The nozzle orifices to be inspected are not limited to all the nozzle orifices (180 nozzle orifices) the recording head module has. For instance, in case when a part of nozzle orifices is inspected as a typical nozzle orifice or in case when no nozzle orifice is used for printing, a part of the nozzle orifices may be the nozzle orifices to be inspected. In other words, all the continuous nozzle orifices of the predetermined number M are not necessary to be inspected and a nozzle orifice, to which no ejection-executing data corresponds, whereby no fluid is ejected from, may exist among the predetermined number M of the nozzle orifices.

(Tenth Modification)

The adjustment of the starting address AD is not limited to be taken place in the blank data. For example, blank data may be divided and added to both upper and lower ends of the unit ejection data in the reading direction. In this case, a method may be employed, in which the data transfers are executed by changing a starting address to other starting addresses shifted by the data corresponding to predetermined numbers so that all area including ejection-executing data (data of the value "1") is selected to be transferred in the range of the inspective ejection data. Furthermore, an inspective ejection data in which the blank data Db is added to the unit ejection data Da at only the downstream thereof in the reading direction. In this case, the data corresponding to the nozzle orifices of #136 to #180 are set to be the ejection-executing data "1" while the data corresponding to the nozzle orifices of #1 to #135 are set to be the non-ejection data "0" in the unit ejection data Da. The transfer start address (the front address) is shifted by the number "45" in the range of #1 to #135 in the unit ejection data Da.

(Eleventh Modification)

Not only the data having the structure with which the ink droplets are ejected from all the nozzle orifices to be inspected at different timings of ejections is employed, but also data having a structure with which the ink droplets are ejected simultaneously from a plurality of nozzle orifices may be employed. If the device has a structure including a light emitting unit and a light receiving unit which enables irradiation of a different ink-droplets-flight paths with a plurality of laser beams, or if the device has a structure including a plurality of caps or flushing boxes on which the ink droplets are landed in the electric field system, the device is configured such that the ink droplets are ejected simultaneously from the nozzle orifices capable of being inspected at the same time.

(Twelfth Modification)

The length of the blank data (non-ejection data) Db is not limited to be the length obtained by deducting the predetermined number M from the total number of nozzle orifices Q (when Q=180, M=45, the length is for "135" nozzle orifices), as long as the data length is longer than the data for Q/M. When the blank data Db is divided and added to both upper and lower ends of the inspective ejection data in this twelfth modification, total of each blank data added to the leading and trailing side only need to be Q/M or more.

(Thirteenth Modification)

The controlling unit 42 may be configured with only software, only hardware, or a combination thereof. For instance, when the controlling unit 42 is software configured by a CPU which executes programs, the controlling unit 42 may execute data transferring processing instead of the DMA controller which is hardware.

(Fourteenth Modification)

The present invention is applied to a serial printer of an ink jet recording type in the foregoing embodiment, however, the invention may be applied to a line printer of an ink jet recording type. Even when applied to the line printer, a memory area for storing nozzle orifice inspection data can be kept small.

(Fifteenth Modification)

The invention is materialized in the ink jet type recording apparatus according to the foregoing embodiment, however, it is not limited. The invention may be materialized in a fluid ejection apparatus which ejects a fluid other than ink (including a liquid, a liquid state material in which particles of functional material are dispersed or mixed, a gel-like fluid state material, and a solid which is capable of flowing so as to be ejected as a fluid). For example, the apparatus may be the followings: a liquid state material ejection apparatus which ejects a liquid state material including electrode materials or color materials (picture element materials) dispersed or dissolved therein, the electrode materials or color materials being used in a liquid crystal display, an EL (electro luminescence) display or a vertical cavity surface emitting display; a liquid ejection apparatus which ejects organic matters in a living body used to produce a biochip; and a liquid ejection apparatus which is used as a precision pipette to eject a test sample liquid. Furthermore, the apparatus maybe the followings: a liquid ejection apparatus which ejects a lubricating oil with pinpoint accuracy on precision instruments such as a clock and a camera; a liquid ejection apparatus which ejects a transparent resin liquid such as ultraviolet cure resins on to a substrate so as to form micro-bull's-eye lens (optical lens) or the like which is used in optical communication elements; a liquid ejection apparatus which ejects an etchant such as acids or alkalis so as to etch a substrate or the like; liquid ejection apparatus which ejects a fluid state material such as gels (e.g. a physical gel); and a powder-and-granular-material ejection apparatus (e.g. toner jet recording apparatus) which ejects solids, for example, particles (powder and granular material) such as toner. The present invention can be applied to any one of the foregoing fluid ejection apparatus. Even when employing one of the foregoing structures, a memory area for storing nozzle orifice inspection data for detect the clogged nozzle orifice can be kept small. Note that the word "fluid" in this specification indicates a concept excluding a fluid consisted of only air. The word "fluid" includes, for example, a liquid (including an inorganic solvent, an organic solvent, a solution, a liquid resin, a liquid metal (metal melt) and the like), a liquid state material, a fluid state material, a powder and granular material (including particles and powders). Also, the word "target" in this specification indicates the aforementioned substrates, the precision instruments and the like.

What is claimed is:

1. An inspective ejection method for causing a fluid to be ejected from nozzle orifices of a fluid ejection apparatus, the fluid ejection apparatus including an ejection unit having a plurality of the nozzle orifices capable of allowing the fluid to be ejected therethrough to a target, and an ejection driving unit that drives the ejection unit, the method comprising steps of:
    storing inspective ejection data in a memory, the inspective ejection data including: unit ejection data which is configured to shift a timing of ejection from each of the nozzle orifices to be inspected in one inspection period, the unit ejection data being used for individually inspecting each nozzle orifice belonging to a group of continuous nozzle orifices of a predetermined number M which is less than total number Q of the nozzle orifices; and non-ejection data having a length of at least Q−M and being added continuously to at least one of a leading side and a trailing side in a unit ejection data reading direction;
    selecting one transfer start address from among a plurality of transfer start addresses which are set in the area of the inspective ejection data at an interval of M, the selection being made in a manner to avoid duplication of the transfer start address;
    transferring to the ejection driving unit the inspective ejection data read from the memory starting from the selected transfer start address; and
    repeating the selecting step and the transferring step a plurality of times of a natural number which is Q/M or greater while changing the transfer start address.

2. The method according to claim 1, wherein the fluid ejection apparatus includes a control unit and a DMA transferring unit, and wherein the selecting step causes the control unit to set the transfer start addresses in the DMA transferring unit, and the transferring step causes the DMA transferring unit to transfer the inspective ejection data read starting from the transfer start address to the ejection driving unit.

3. The method according to claim 2, wherein in the unit ejection data are set a number of segments equal to a multiple of eight per one nozzle orifice, and the number of the ejections to be performed not greater than the number of the segments, and wherein the data transfer from the memory in each transferring step is performed on a predetermined bit-width basis corresponding to a multiple of eight.

4. A fluid ejection apparatus including an ejection unit having a plurality of the nozzle orifices capable of allowing the fluid to be ejected therethrough to a target, the apparatus comprising:
    a memory which stores inspective ejection data including: unit ejection data which is configured to shift a timing of ejection from each of the nozzle orifices to be inspected in one inspection period, the unit ejection data being used for individually inspecting each nozzle orifice belonging to a group of continuous nozzle orifices of a predetermined number M which is less than total number Q of the nozzle orifices; and non-ejection data having a length of at least Q−M and being added continuously to at least one of a leading side and a trailing side in a unit ejection data reading direction;
    an ejection driving unit which drives the ejection unit so as to cause the fluid to be ejected from the nozzle orifices of the ejection unit according to the inspective ejection data;
    an address setting unit which selects one transfer start address from among a plurality of transfer start addresses which are set in the area of the inspective ejection data at an interval of M, the selection being made in a manner to avoid duplication of the transfer start address; and
    a transferring unit which transfers to the ejection driving unit the inspective ejection data read from the memory starting from the selected transfer start address,
    wherein the transferring unit repeats the selecting and the transferring a plurality of times of a natural number which is Q/M or greater while changing the transfer start address.

* * * * *